(12) United States Patent
Hou

(10) Patent No.: US 7,804,776 B2
(45) Date of Patent: Sep. 28, 2010

(54) SYSTEM AND METHOD FOR VARIABLE DATA TRANSMISSION RATE RESOLUTION

(75) Inventor: Cheng-Liang Hou, Kaohsiung (TW)

(73) Assignee: Broadcom Corporation, Irvine, CA (US)

(*) Notice: Subject to any disclaimer, the term of this patent is extended or adjusted under 35 U.S.C. 154(b) by 1447 days.

(21) Appl. No.: 10/694,732

(22) Filed: Oct. 29, 2003

(65) Prior Publication Data

US 2005/0030957 A1 Feb. 10, 2005

Related U.S. Application Data

(60) Provisional application No. 60/492,961, filed on Aug. 7, 2003.

(51) Int. Cl.
*H04J 1/16* (2006.01)
*H04L 12/26* (2006.01)

(52) U.S. Cl. ............... 370/230.1; 370/230; 370/231; 370/235

(58) Field of Classification Search ............... None
See application file for complete search history.

(56) References Cited

U.S. PATENT DOCUMENTS

| 5,936,940 | A  | * | 8/1999 | Marin et al. | 370/232 |
| 6,219,343 | B1 | * | 4/2001 | Honkasalo et al. | 370/335 |
| 6,597,693 | B1 | * | 7/2003 | Leung | 370/386 |
| 6,693,913 | B1 | * | 2/2004 | Chiussi et al. | 370/412 |
| 2004/0017306 | A1 | * | 1/2004 | Miao | 341/155 |

* cited by examiner

*Primary Examiner*—Raj Jain

(57) ABSTRACT

A system and method for variable data transmission rate resolution is provided. The system implements a method comprising incrementing a port transmission rate using a variable resolution; and transmitting data through the port using the incremented port transmission rate.

10 Claims, 3 Drawing Sheets

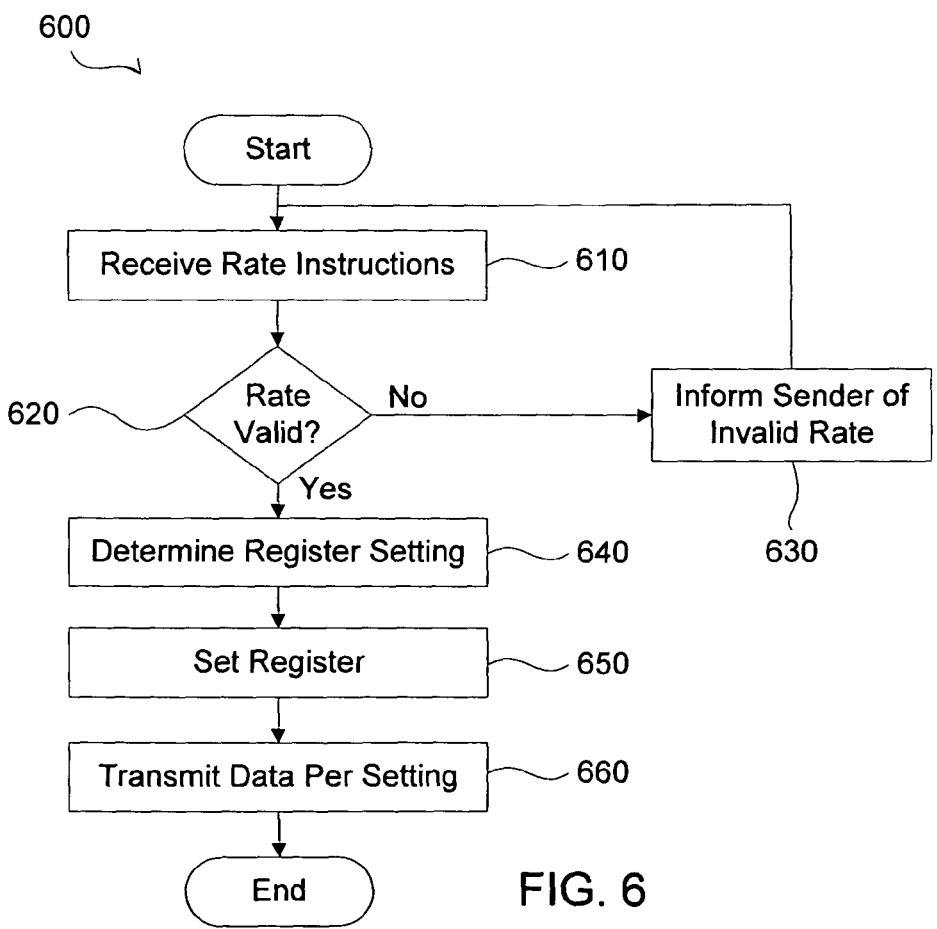

SYSTEM AND METHOD FOR VARIABLE DATA TRANSMISSION RATE RESOLUTION

CROSS REFERENCE TO RELATED APPLICATIONS

This application claims priority of U.S. Provisional Patent Application Ser. No. 60/492,961, entitled "Segmented Rate Control," filed on Aug. 7, 2003. The subject matter of this earlier filed application is hereby incorporated by reference.

BACKGROUND OF THE INVENTION

1. Field of the Invention

This invention relates generally to switches, and more particularly, but not exclusively, to variable data transmission rate resolution in switches on a port-by-port basis.

2. Description of the Related Art

Networks, such as local area networks (i.e., LANs) and wide area networks (i.e., WANs, e.g., the Internet), enable a plurality of nodes to communicate with each other. Nodes can include computers, servers, storage devices, mobile devices, PDAs, wireless telephones, etc. Networks can include the nodes themselves, a connecting medium (wired, wireless and/or a combination of wired and wireless), and network switching systems such as routers, hubs and/or switches.

Conventionally, node owners pay switch operators based on the speed that the switch transmits data to and from a node. The speed (rate) of data transmission is generally increased or decreased linearly with a fixed resolution. In other words, the rate can be increased or decreased in quantized fixed amounts.

In order to indicate the rate in the switch, registers in the switch are set with values that are proportional to the rate required. For example, using a resolution of 64 Kbps, a register value of 1 would indicate 64 kbits while a register value of 2 would indicate 128 kbps. Accordingly, a 15-bit register would be required to indicate a maximum rate of 100 Mbps.

A disadvantage of the current system and method to indicate port speed is that the resolution is fixed across the full range of possible rates. Accordingly, the resolution may be too high when increasing the rate at high rates. For example, with a 64 kbit resolution a jump in speed from 100 Mbps to 110 Mbps would require incrementing the value of the registers by 164, thereby requiring a large number of registers, which increases chip cost. Alternatively, a low resolution, such as 1 Mbps, which may be preferable at high rates, would be unusable at low rates since it would not enable setting different rates below 1 Mbps. Therefore, a new system and method is needed to overcome this disadvantage.

SUMMARY OF THE INVENTION

Embodiments of the invention provide a system and method for incrementing (increasing or decreasing) a data transmission rate (ingress and/or egress) in a switch or other device using a variable resolution. In one embodiment, the resolution decreases as the rate increases, thereby enabling smaller registers to indicate port data transmission rates while still maintaining adequate resolution in different data transmission rate ranges.

In an embodiment of the invention, the system comprises a rate setting engine and a transmission engine. The rate setting engine increments a port transmission rate (ingress and/or egress) using a variable resolution. The transmission engine, which is communicatively coupled to the rate setting engine, transmits data to and from the port using the incremented port transmission rate.

In an embodiment of the invention, the method comprises incrementing a port transmission rate using a variable resolution; and transmitting data through (ingress and/or egress) the port using the incremented port transmission rate.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is a table illustrating the example rate data structure; and

FIG. 6 is a flowchart illustrating a method for setting rates in a switch.

DETAILED DESCRIPTION OF THE PREFERRED EMBODIMENTS

The following description is provided to enable any person having ordinary skill in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
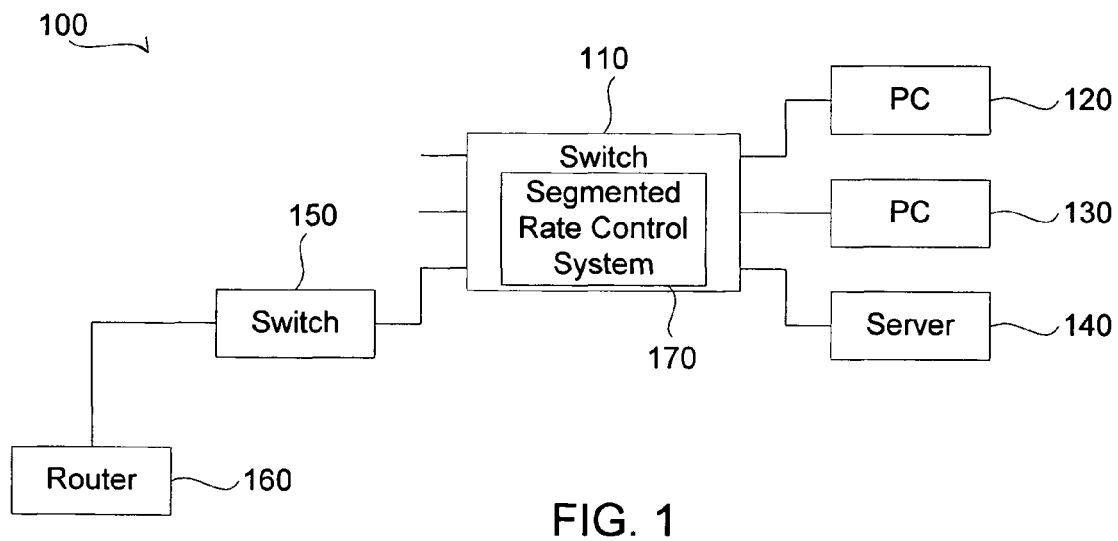
FIG. 1 is a block diagram illustrating a network system in accordance with an embodiment of the present invention.

FIG. 1 is a block diagram illustrating a network system 100 in accordance with an embodiment of the present invention. The network system 100 includes 6 nodes: PCs 120 and 130, a server 140, a switch 110, a switch 150, and a router 160. The switch 150, the PC 120 and 130, and the server 140 are each communicatively coupled, via wired or wireless techniques, to the switch 110. The router 160 is communicatively coupled, via wired or wireless techniques, to the switch 150. It will be appreciated by one of ordinary skill in the art that the network system 100 can include additional or fewer nodes and that the network system 100 is not limited to the types of nodes shown. For example, the switch 110 can be further communicatively coupled to network clusters or other networks, such as the Internet.

The switch 110 includes a segmented rate control system 170, which will be discussed in further detail in conjunction with FIG. 3. The system 170 enables each port of the switch 110 to receive and transmit data at rates independent of data transmission rates of the other ports of the switch 110. Further, the system 170 enables variable resolution as a function of the data transmission rate. For example, the system 170 can enable the PC 120 to communicate with the switch 110 at 64 Kbps while the PC 130 can communicate with the switch 110 at 128 Kbps and the server 140 communicates with the switch 110 at 2 Mbps. If the PC 120 or the PC 130 owner needs to increase the data transmission rate, the system 170 enables increases with a resolution of 64 Kbps. For example, system 170 enables the data transmission rate between a port on the switch 110 and the PC 120 to increase from 64 Kbps to 128 Kbps and separately enable the data transmission rate between a port on the switch 110 and the PC 130 to increase from 128 Kbps to 192 Kbps. Further, system 170 can enable the data transmission rate between a port on the switch 110 and the server 140 to increase from 2 Mbps to 3 Mbps in one step (instead of 16 individual steps if the resolution was set to 64 Kbps as in the <2 Mpbs range).

Figure 2:
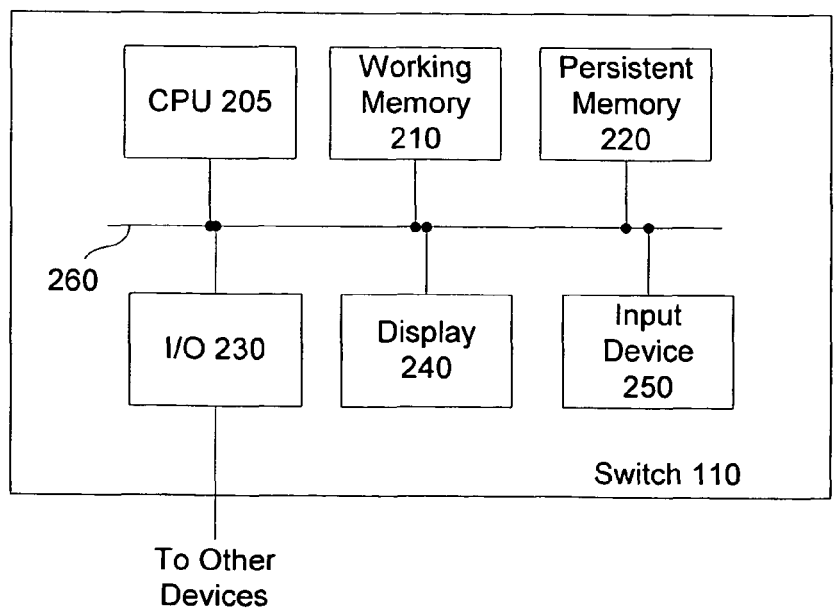
FIG. 2 is a block diagram illustrating an example switch in accordance with the present invention.

FIG. 2 is a block diagram illustrating a switch 110 in accordance with an embodiment of the present invention. The switch 110 includes a central processing unit (CPU) 205; working memory 210; persistent memory 220; input/output (I/O) interface 230; display 240 and input device 250, all communicatively coupled to each other via a bus 260. The CPU 205 may include an INTEL PENTIUM microprocessor, a Motorola POWERPC microprocessor, or any other processor capable to execute software stored in the persistent memory 220. The working memory 210 may include random access memory (RAM) or any other type of read/write memory devices or combination of memory devices. The persistent memory 220 may include a hard drive, read only memory (ROM) or any other type of memory device or combination of memory devices that can retain data after switch 110 is shut off. The I/O interface 230 is communicatively coupled, via wired and/or wireless techniques, to other nodes, such as the PC 120 or the server 140. The display 240 may include a cathode ray tube display or other display device. The input device 250 may include a keyboard, mouse, or other device for inputting data, or a combination of devices for inputting data.

One skilled in the art will recognize that the switch 110 may also include additional devices, such as network connections, Application Specific Integrated Circuits (ASICs), additional memory, additional processors, LANs, input/output lines for transferring information across a hardware channel, the Internet or an intranet, etc. One skilled in the art will also recognize that the programs and data may be received by and stored in the switch 110 in alternative ways.

Figure 3:
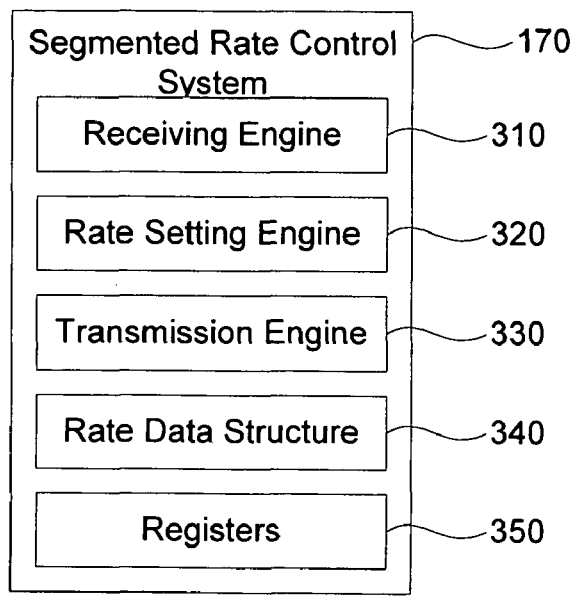
FIG. 3 is a block diagram illustrating a segmented rate control system of FIG. 1.

FIG. 3 is a block diagram illustrating the segmented rate control system 170. The system 170 includes a receiving engine 310, a rate setting engine 320, a transmission engine 330, a rate data structure 340, and registers 350. In an embodiment of the invention, the components of the system 170 can comprise an ASIC or ASICs, software, other devices or a combination thereof. For example, the receiving engine 310, the rate setting engine 320 and the rate data structure 340 can comprise software while the transmission engine 330 can comprise an ASIC, which enables faster routing of data between nodes in the network system 100 as compared to a software implementation.

The receiving engine 310 receives rate setting instructions from a switch controlling node, such as PC 120. In another embodiment of the invention, the receiving engine 310 can receive rate setting instructions via direct input to the switch 110 via the input device 250. In this embodiment, the receiving engine 310 can also provide a graphical user interface (GUI) to be displayed on the display 240 to assist a user in inputting rate control information. In another embodiment of the invention, a GUI can be provided on the controlling node thereby enabling ease of rate control instruction entry.

The rate setting instructions received by the receiving engine 310 specify by port the rate that data to each port should be transmitted at. The instructions can include the registers 350 values or actual rates, which the rate setting engine 320 then translates into register values and stores within the registers 350. As will be discussed further below, each port has a designated register or designated portion of a register in the registers 350. In an embodiment of the invention, the receiving engine 310 verifies that the receiving rate setting instructions are valid. For example, the receiving engine 310 can confirm that the switch 110 is capable of transmitting data at the rate specified in the rate setting instructions. If the specified rate exceeds the capability of the switch 110, the receiving engine 310 can inform the inputer of the instructions that the specified rate exceeds the switch's capability (e.g., via a GUI displayed on the display 240 or via a message to the controlling node).

Further, the receiving engine 310 can confirm that the specified rate is valid by checking if the switch 110 can transmit data at the specified rate in the rate setting instructions. For instance, the specified rate may not be available since rates can only be incremented in fixed amounts. For example, a specified rate of 100 kbps would be invalid since the resolution below 2 Mbps is 64 kbps. In other words, the switch 110 would be able to transmit data at 64 kbps or 128 kbps, but not 100 kbps. If the specified rate is invalid, then the receiving engine 310 can inform the inputer of the instructions that the specified rate is not valid (e.g., via a GUI displayed on the display 240 or via a message to the controlling node).

The rate setting engine 320, using rate setting instructions received from the receiving engine 310, sets the data transmission rates for each port of the switch 110 by storing corresponding values in the registers 350 that correspond with the ports identified in the rate setting instructions. In operation, the rate setting engine 320 receives a specified rate for a port in the rate setting instructions from the receiving engine 310. The rate setting engine 320 then determines the register setting by looking up the register value corresponding to the specified rate in the rate data structure 340. The rate setting engine 320 then sets the registers 350 corresponding to the specified port to the value looked up in the rate data structure 340. Alternatively, the rate setting instructions may specify a register value corresponding to the rate wanted. Accordingly, the rate setting engine 320 would then only need to set the appropriate register to that value without resorting to looking up the register value in the rate data structure 340.

In one embodiment of the invention, the rate setting engine 320 can determine the registers 350 value by calculating it without using the rate data structure 340. For example, for a rate of 2 Mbps or less, the rate setting engine 320 can calculate the registers 350 value by dividing the specified rate by the <2 Mbps resolution (i.e., 64 Kbps). For rates between 2 Mbps and 100 Mbps, the register value can be calculated by subtracting 2 Mbps from the specified rate; dividing the balance by the resolution in this range (i.e., 1 Mbit); and adding 32. For rates above 100 Mbps, the register value can be calculated by subtracting 100 Mbps from the specified rate; dividing the balance by 8 Mbit; and then adding 130. It will be appreciated by one of ordinary skill in the art that other equations can be used to calculate the register setting (e.g., the registers 350 value is equal to the square root of the specified rate or the registers can be segmented linearly at different ranges).

In an embodiment of the invention, the rate setting engine 320 can set the registers 350 when the specified rate is invalid. For example, if the specified rate in the received rate setting instructions is between valid rates, the rate setting engine 320 can set the registers 350 to the closest valid rate. Alternatively, if the specified rate in the received rate setting instructions is greater than the maximum possible rate, the rate setting engine 320 can set the registers 350 to the maximum rate supported by the switch 110. In another embodiment, the rate setting engine 320 can set the registers 350 to a default rate (e.g., 100 Mbps) when the specified rate is invalid.

The transmission engine 330 transmits data between network system 100 nodes according to register values associated with each port of the switch 110. During operation, the transmission engine 330 reads the registers 350 value for each port associated with a network system 100 node and then transmits data (ingress and/or egress), if any, to and from that node at the rate indicated in the corresponding register. For example, data can be sent to and received from the server 140 at a rate of 2 Mbps while data can be sent to and received from the PC 120 at 64 Kbps.

The transmission engine 330 can determine what rate to transmit data at by reading the registers 350 and then converting the registers 350 values into speeds by either using the rate data structure 340 or by calculating the corresponding rate. For example, for a registers 350 values of less than or equal to 32, the transmission engine 330 can calculate the rate by multiplying the registers 350 value by the <2 Mbps resolution (i.e., 64 Kbps). For rates above 32 up to and including 130, the rate can be calculated by subtracting the registers 350 value by 32, multiplying the balance by the 2-100 Mbps resolution (e.g., 1 Mbps), and then adding 2 Mbps. For registers 350 values over 130, the transmission engine 330 can calculate the rate by subtracting 130 from the registers 350 value, multiplying the balance by the >100 Mbps resolution (e.g., 8 Mbps) and adding 100 Mbps. It will be appreciated by one of ordinary skill in the art that alternative calculations can be done to calculate a rate (e.g., the rate can be equal to the square of the registers 350 value or the rate can be segmented linearly in different ranges).

The rate data structure 340, which will be discussed in further detail in conjunction with FIG. 4 and FIG. 5, lists register values and associated data transmission rates. The rate setting engine 320 and/or the transmission engine 330 can use this data structure to convert between registers 350 values and data transmission rates, as discussed above. In an alternative embodiment of the invention, the rate data structure 340 is optional, like other components of the invention, and the rate setting engine 320 and the transmission engine 330 determine corresponding rates and registers 350 values via calculations.

The registers 350 comprise registers that are capable of holding values indicative of data transmission speeds for each port of the switch 110. Each port can have an individual register or registers associated with it or a portion of a register associated with it. An advantage of the current invention is that the size of the registers 350 can be greatly reduced while still maintaining adequate resolution at different rate ranges. Conventionally, for high resolution (e.g., 64 kbps), 15-bit registers would be required. However, embodiments of the invention would only require 8-bit registers because of the decreased resolution at high rate ranges.

Figure 4:
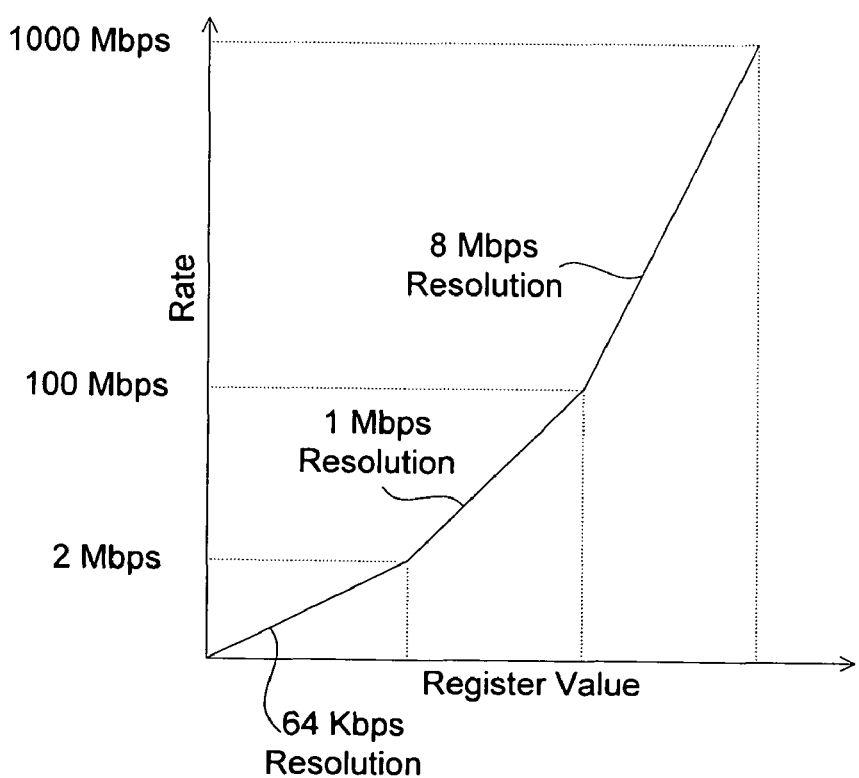
FIG. 4 is a graph illustrating an example rate data structure.

FIG. 4 is a graph illustrating an example rate data structure 400 (e.g., the rate data structure 340). The rate setting engine 320 and/or the transmission engine can use a rate data structure, such as the example rate data structure 400, to convert between the registers 350 values and data transmission rates. The example rate data structure 400 includes three segments, each having a different resolution. The first segment is from 0 to 2 Mbps with a resolution of 64 Kbps—i.e., the data transmission rate can be increased linearly in 64 Kbps increments. The second segment is from 2 Mbps to 100 Mbps with a resolution of 1 Mbps—i.e., the data transmission rate can be increased linearly in 1 Mbps increments. The third segment is from 100 Mbps to 1000 Mbps with a resolution of 8 Mbps—i.e., the data transmission rate can be increased linearly in 8 Mbps increments.

It will be appreciated by one of ordinary skill in the art that the example rate data structure 400 can include additional or fewer segments. Further, it will be appreciated that the example rate data structure 400 can have segments of different ranges and also different resolutions than those depicted. It will further be appreciated by one of ordinary skill in the art that the segments can be replaced with a non-linear exponential curve or other curve that features decreasing resolution at higher data transmission rates.

FIG. 5 is a table illustrating the example rate data structure 400, e.g., the rate data structure 340. While the example rate data structure 400 is shown in the format of table, other embodiments may include other formats, such as linking lists. For each register value, the example rate data structure 400 includes a corresponding data transmission rate expressed in Kbps. It will be appreciated by one of ordinary skill in the art that the data transmission can be expressed in other units. The rate setting engine 320 sets the registers 350 values by looking up the specified rate from the received rate instructions in the example rate data structure 400 and reading the corresponding register value in the structure 400. The rate setting engine 320 can then set the registers 350 to this value.

FIG. 6 is a flowchart illustrating a method 600 for setting rates in a switch. In an embodiment of the invention, the segmented rate control system 170 can execute the method 600. Further, multiple instances of the method 600 can be run substantially simultaneously. First, rate instructions are received (610), either from a node in the network system, such as PC 120 in the network system 100, or via an input device on the switch itself, such as the input device 250 on the switch 110. The rate instructions include a specified rate for at least one port.

Next, it is determined (620) if the specified rate is valid. The rate may be invalid if it exceeds the capabilities of the switch or if the rate is between switch rate settings (e.g., 100 Kbps between 64 Kbps and 128 Kbps). If the rate is invalid, then the sender is informed (630) of the problem and the method returns to the receiving (610). The informing (630) can be done via a GUI on a display of the switch itself, e.g., the display 240, or by communicating the information to a node that sent the rate instructions, e.g., the PC 120 of the network system 100.

If it is determined (620) that the rate is valid, then the register setting is determined (640). The determination (640) can be done via looking up a register setting in a rate data structure, such as the rate data structure 340; via a calculation, as discussed above in conjunction with the rate setting engine 320 of FIG. 3; or via other techniques. The register (e.g., of registers 350) corresponding to the port specified in the received instructions is then set (650) according to the determination (640). Data is then transmitted (660) via that port at the rate specified.

In an embodiment of the invention, the method 600 can repeated for each port. Alternatively, the received rate instructions can include specified rates for a plurality of the ports and the method 600 can perform the operations necessary either consecutively or substantially simultaneously.

In another embodiment of the invention, if the rate received (610) is determined (620) to be invalid, the method 600 can inform (630) the sender of the invalid rate and then determine (640) the closest valid rate (or a default rate) and set (650) the corresponding register to that determined (640) rate.

The foregoing description of the illustrated embodiments of the present invention is by way of example only, and other variations and modifications of the above-described embodiments and methods are possible in light of the foregoing teaching. Components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

I claim:

1. A method, comprising:
    storing a first plurality of data transmission rates in a register, wherein each of the first plurality of data transmission rates are spaced from each other by a first incremental value;
    storing a second plurality of data transmission rates in a register, wherein the rates of the second plurality of data transmission rates are greater than the rates of the first plurality of data transmission rates and wherein each of the second plurality of data transmission rates are spaced from each other by a second incremental value that is greater than the first incremental value;
    storing a third plurality of data transmission rates in a register, wherein the rates of the third plurality of data transmission rates are greater than the rates of the second plurality of data transmission rates and wherein each of the third plurality of data transmission rates are spaced from each other by a third incremental value greater than the second incremental value,
    wherein the second incremental value is at least three times larger than the first incremental value, and wherein the third incremental value is at least ten times larger than the first incremental value;
    receiving a request to transmit data over a port of a switch at a requested transmission rate;
    selecting one of the first plurality of data transmission rates or one of the second data transmission rates or one of the third data transmission rates at which to transmit data over the port, wherein the selected transmission rate is based on the requested transmission rate; and
    transmitting data through the port using the selected data transmission rate.

2. The method of claim 1, wherein the first incremental value is 64 Kbps, the second incremental value is 1 Mbps, and the third incremental value is 8 Mbps.

3. The method of claim 1, wherein a first plurality of data transmission rates includes rates from 0 Kbps to 2 Mbps, a second plurality of data transmission rates includes rates from 2 Mbps to 100 Mbps, and third plurality of data transmission rates includes rates from 100 Mbps to 1000 Mbps.

4. A data transmission rate control system, comprising:
    means for storing a first plurality of data transmission rates, wherein each of the first plurality of data transmission rates are spaced from each other by a first incremental value;
    means for storing a second plurality of data transmission rates, wherein the rates of the second plurality of data transmission rates are greater than the rates of the first plurality of data transmission rates and wherein each of the second plurality of data transmission rates are spaced from each other by a second incremental value that is greater than the first incremental value;
    means for storing a third plurality of data transmission rates in a register, wherein the rates of the third plurality of data transmission rates are greater than the rates of the second plurality of data transmission rates and wherein each of the third plurality of data transmission rates are spaced from each other by a third incremental value greater than the second incremental value, wherein the second incremental value is at least three times larger than the first incremental value, and wherein the third incremental value is at least ten times larger than the first incremental value;
    means for receiving a request to transmit data over a port of a switch at a requested transmission rate;
    means for selecting one of the first plurality of data transmission rates or one of the second data transmission rates or one of the third data transmission rates at which to transmit data over the port, wherein the selected transmission rate is based on the requested transmission rate; and
    means for transmitting data through the port using the selected data transmission rate.

5. A data transmission rate control system, comprising:
    registers configured for storing a first plurality of data transmission rates, wherein each of the first plurality of data transmission rates are spaced from each other by a first incremental value;
    registers configured for storing a second plurality of data transmission rates, wherein the rates of the second plurality of data transmission rates are greater than the rates of the first plurality of data transmission rates and wherein each of the second plurality of data transmission rates are spaced from each other by a second incremental value that is greater than the first incremental value;
    registers configured for storing a third plurality of data transmission rates in a register, wherein the rates of the third plurality of data transmission rates are greater than the rates of the second plurality of data transmission rates and wherein each of the third plurality of data transmission rates are spaced from each other by a third incremental value greater than the second incremental value, wherein the second incremental value is at least three times larger than the first incremental value, and wherein the third incremental value is at least ten times larger than the first incremental value
    a receiving engine configured for receiving a request to transmit data over a port of a switch at a requested transmission rate;
    a rate setting engine configured to select one of the first plurality of data transmission rates or one of the second data transmission rates or one of the third data transmission rates at which to transmit data over the port, wherein the selected transmission rate is based on the requested transmission rate; and
    a transmission engine, communicatively coupled to the rate setting engine, the transmission engine configured to transmit data through the port using the selected data transmission rate.

6. The system of claim 5, wherein the first incremental value is 64 Kbps, the second incremental value is 1 Mbps, and the third incremental value is 8 Mbps.

7. The system of claim 5, wherein a first plurality of data transmission rates includes rates from 0 Kbps to 2 Mbps, a second plurality of data transmission rates includes rates from 2 Mbps to 100 Mbps, and third plurality of data transmission rates includes rates from 100 Mbps to 1000 Mbps.

8. A non-transitory computer-readable medium having stored thereon instructions to be executed by one or more processors to:
    store a second plurality of data transmission rates in a register, wherein the rates of the second plurality of data transmission rates are greater than the rates of the first plurality of data transmission rates and wherein each of the second plurality of data transmission rates are spaced from each other by a second incremental value that is greater than the first incremental value;

store a third plurality of data transmission rates in a register, wherein the rates of the third plurality of data transmission rates are greater than the rates of the second plurality of data transmission rates and wherein each of the third plurality of data transmission rates are spaced from each other by a third incremental value greater than the second incremental value, wherein the second incremental value is at least three times larger than the first incremental value, and wherein the third incremental value is at least ten times larger than the first incremental value;

receive a request to transmit data over a port of a switch at a requested transmission rate;

select one of the first plurality of data transmission rates or one of the second data transmission rates or one of the third data transmission rates at which to transmit data over the port, wherein the selected transmission rate is based on the requested transmission rate; and transmit data through the port using the selected data transmission rate.

9. The computer-readable medium of claim 8, wherein the first incremental value is 64 Kbps, the second incremental value is 1 Mbps, and the third incremental value is 8 Mbps.

10. The computer-readable medium of claim 8, wherein a first plurality of data transmission rates includes rates from 0 Kbps to 2 Mbps, a second plurality of data transmission rates includes rates from 2 Mbps to 100 Mbps, and third plurality of data transmission rates includes rates from 100 Mbps to 1000 Mbps.

* * * * *